INVENTOR.

Patented Sept. 9, 1952

2,610,316

UNITED STATES PATENT OFFICE 2,610,316

AMPLIFYING DYNAMOELECTRIC MACHINE OF THE METADYNE TYPE

Joseph Maximus Pestarini, Staten Island, N. Y.

Application April 22, 1948, Serial No. 22,575

6 Claims. (Cl. 322—92)

The invention relates to a rotating dynamo-electric machine.

An object of the invention is to provide improved means for amplifying a control current or a linear combination of control currents.

Another object of the invention is to provide an amplifying dynamoelectric machine, including means energized by a direct current to cause said machine to rotate.

A further object of the invention is to provide dynamo means for supplying the amplified current to one or more separate external electric circuits simultaneously.

A still further object of the invention is to provide a current amplifying machine including means for improving the operation of said current amplifying machine during periods of a temporary increased demand for amplified current.

Still another object of the invention is to provide a current amplifying machine including simplified stator windings.

Figure 1:
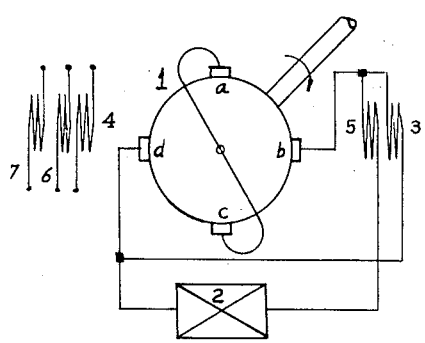
Figure 2:
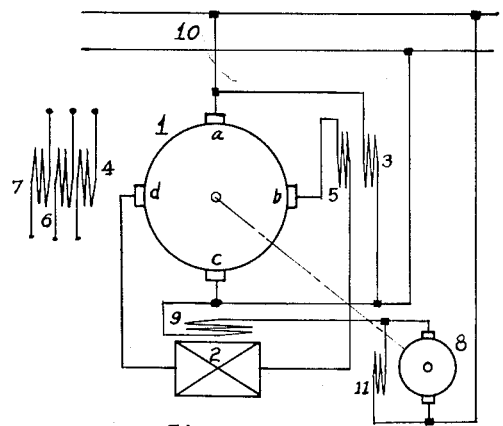
Figure 3:
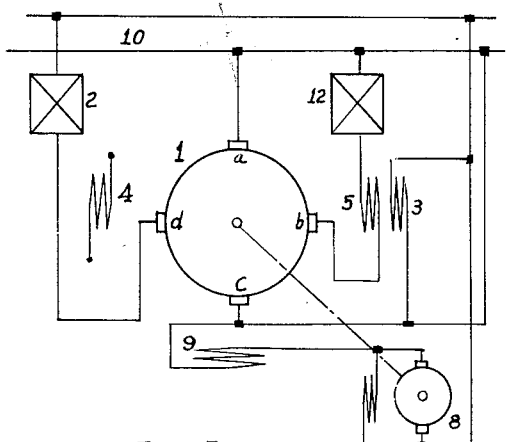
Figure 4:
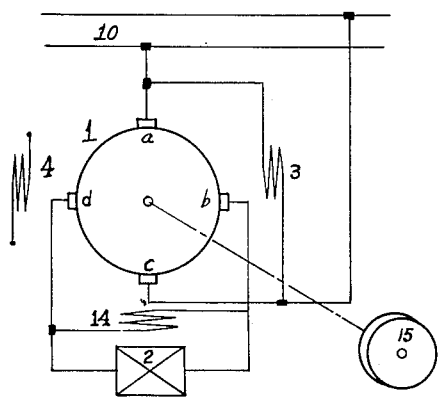
Figure 5:
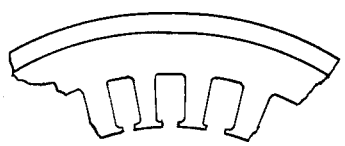
Figure 6:
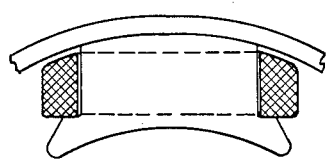
Figure 7:
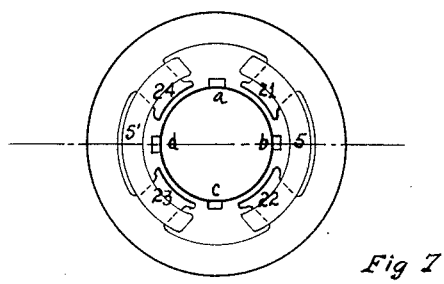

The invention is illustrated in the accompanying drawings, wherein:

Figure 1 shows schematically a dynamoelectric machine of the conventional metadyne type for amplifying a combination of control currents; Figure 2 shows schematically a dynamoelectric machine embodying the invention adapted to supply a single external circuit with amplified current; Figure 3 shows schematically a dynamoelectric machine embodying the invention for supplying two different external circuits with amplified current; Figure 4 shows schematically the dynamoelectric machine embodying the invention and provided with means for handling unusual load conditions; Figure 5 shows the details of a portion of the stator of a device embodying the invention; Figure 6 shows details of a pole segment of a device embodying the invention and Figure 7 shows details of the arrangement of stator windings on the stator of a device embodying the invention.

The metadyne hereinafter mentioned is a dynamoelectric machine provided with an armature associated with a commutator and having more than two brushes per cycle. A cycle is the number of repetitions of identical electric and magnetic parts of the machine as seen by an observer, moving along the air gap of the machine and executing a circumference. The metadyne has been described in many United States patents of the applicant, see No. 2,030,652, No. 1,969,699, No. 2,093,209, No. 2,094,492, and a detailed description thereof is given in Revue Generale de l'Electricite, Paris, March 8th and 15th, August 16th and 23rd, November 22nd and 29th and December 6th, 1930.

Figure 1 shows an amplifier generator metadyne described in previous patents of the applicant. The single cycle armature 1 is provided with four brushes, two of which are non-consecutive primary brushes $a$, $c$, substantially short circuited and two of which are secondary brushes $b$, $d$. The latter are connected to an external load circuit 2. The amplifier generator metadyne is shown provided with fixed stator windings, 3, 4, 5, 6, 7, having their magnetic axis coincident with the axis of the flux created by the current traversing the armature through its secondary brushes. The windings 4, 6, 7 are traversed by the control currents referred to as $i_4$, $i_6$, $i_7$, respectively. The winding 3 is shunt connected across the secondary brushes $b$, $d$. The winding 5 is series connected to the load 2 and secondary current supplied by the secondary brushes and compensates partially or totally the flux created by the secondary current traversing the armature. The winding 3 is adapted to substantially induce between the primary brushes $a$, $c$, the voltage necessary for creating the primary current, which may be referred to as $I_a$.

The armature is conventionally rotated by a motor not shown in the figure.

Such an amplifier generator metadyne supplies a secondary current, which may be referred to as $I_b$, being any desired linear combination of the pilot currents $i_4$, $i_6$, $i_7$ as indicated in the equation:

$$I_b = K_4 i_4 + K_6 i_6 + K_7 i_7$$

the coefficients K being constant and having any desired value determined by the number of turns of the respective stator windings 4, 6, 7, taken in conjunction with the number of turns in stator winding 5. It is understood that any number of control currents may be supplied provided appropriate stator windings are available.

Figure 2 shows schematically an amplifier transformer metadyne embodying the invention. The primary brushes $a$, $c$, on the commutator thereof are connected to a direct current source indicated by a pair of conductors 10. The secondary brushes $b$, $d$ are connected to an external load circuit 2. The stator windings 4, 5, 6, 7 have the same function as previously explained in connection with Figure 1. The winding 3 is shunt connected across the primary brushes $a$, $c$, and induces between said brushes a voltage substantially equal to the voltage of the direct current source connected to conductors 10.

An auxiliary dynamo 8 is mechanically coupled with the metadyne 1. The dynamo is shunt excited through the field winding 11 and is connected to the direct current source through the conductors 10. The current supplied or absorbed by the dynamo 8 traverses a stator winding 9 of the metadyne 1, which is connected between the dynamo 8 and one of the conductors 10. The winding 9 has its magnetic axis coincident with the axis of the flux created by the current traversing the armature of the metadyne 1 through its primary brushes $a$, $c$. The resistance of the field winding 11 is set numerically equal to the voltage induced between the brushes of the dynamo 8, when it rotates at a predetermined speed, referred to as $n_0$, said voltage being induced by the field created by the winding 11 when traversed by a current of one ampere, the magnetic circuit of the dynamo 8 being far from saturation. Under such conditions the dynamo 8 supplies or absorbs a relatively large current for a slight variation of the operational speed from the speed $n_0$, and said current traversing the winding 9 keeps the speed of both metadyne 1 and dynamo 8 at the predetermined speed $n_0$. The dynamo 8 may be referred to as regulator dynamo, its current as regulator current and the winding 9 as regulator winding of the metadyne. Thus the metadyne 1 may be rotated without the need for mechanically interconnected rotating means, such as a motor or the like.

The regulator current, varying very quickly for a slight speed variation from the predetermined value $n_0$, may also be supplied by a series excited dynamo or by a combination of dynamos as disclosed in Patent 1,962,030 or by any other appropriate electromechanical device.

The transformer metadyne of Figure 2 will supply to load circuit 2 a current $I_b$, which is any desired linear combination of the control current $i_4$, $i_6$, $i_7$ as obtained by the generator metadyne of Figure 1 without requiring any driving means. The metadyne 2 also operates with minimum fluctuation of the amplified current. This is partially due to the current traversing winding 3, said current being practically constant while the current of winding 3 of the generator metadyne shown in Figure 1 must vary between large limits according to the instantaneous voltage required by the external load circuit 2. Another reason for reduced fluctuations in the amplified current supplied by the amplifier transformer metadyne of Figure 2, as compared with the amplifier generator metadyne of Figure 1, is due to the fact that when the operation requires a change of direction of the primary current $I_a$, traversing the primary brushes, the resiliency of the magnetic circuit of the metadyne produces a greater variation in the amplification constants K in the case of the generator metadyne of Figure 1.

Figure 3 shows schematically another amplifier transformer metadyne 1, embodying the invention. The primary brushes $a$, $c$, of the metadyne are connected through the pair of conductors 10, to a direct current source. The secondary brush $b$ is connected to one terminal of an external load circuit 12 through stator winding 5. The other terminal of circuit 12 is connected to the primary brush $a$. The secondary brush $d$ is connected to a terminal of another external load circuit 2, the other terminal of which is connected to the primary brush $c$. The stator winding 3 is connected across the primary brushes $a$, $c$. The stator windings 3, 4, 5 and the dynamo 8 excited by the shunt field winding 11 and connected in series with stator winding 9, function in the same manner as the corresponding elements in Figure 2. Only one stator winding traversed by control current has been considered in Figure 3 for the sake of simplicity. It is understood that additional stator control windings may be added, as indicated in Figure 2.

It is apparent that the amplifier transformer metadyne 1 of Figure 3 may energize two external load circuits 2, 12, whereas the amplifier transformer metadyne of Figure 2 energizes only one external load circuit 2.

Figure 4 shows schematically a transformer amplifier metadyne 1 similar to that shown in Figure 2, with the stator winding 14 substituted for the winding 9. The winding 14 is shunt connected across the secondary brushes $b$, $d$ and is set to develop a component torque compensating the component torque due to the action of the other windings on the armature except for a small component torque necessary to keep the metadyne running.

The speed will not be as uniform as with the schemes of Figures 2 and 3, but steady enough for many practical purposes.

In order to absorb possible peaks of power, a flywheel 15 may be coupled to the shaft of the metadyne. Such a flywheel may be also applied in the cases of Figures 2 and 3.

The compensating winding 6 is generally needed when it is desired to obtain greater values for the constants K appearing in the equation hereabove written. For more moderate values, the winding 5 is not necessary and as an example the scheme of Figure 4 does not have this winding.

When a secondary compensating winding is used, it may be arranged on the stator either distributed along the periphery of the air gap and contained in slots provided in the stator laminations as shown in Figure 5 or it may be arranged into concentrated coils, as shown in Figure 6, interlinked with the whole polar segment.

In the latter case, the compensation of armature reaction will be more effective if the corresponding coil is disposed about the two polar segments adjacent to the same extremity of the diameter substantially coincident with the axis of the flux created by the current traversing the armature through the secondary brushes, as shown in Figure 7. In this figure, this axis is indicated by the dotted line $db$. At one extremity of this diameter, the polar segments 21 and 22 are adjacent the axis. At the other extremity, the polar segments 23 and 24 are also adjacent the axis. Thus the one coil 5' of the compensating winding 5 is disposed about both segments 21 and 22 while the other coil 5'' of the same winding is disposed about the two other adjacent polar segments 23 and 24. Such an arrangement also facilitates commutation and reduces the turns of the coils of the commutating poles of the secondary brushes.

In order to locate the stator windings, it has been assumed that the armature winding pitch is diametrical in which case the axis of the flux created by the current traversing the armature through its primary brushes coincides with the commutating axis of said primary brushes, and the axis of the flux created by the current traversing the armature through its secondary brushes coincides with the commutating axis of said secondary brushes.

In case the armature winding pitch is not diametrical the axis of the flux created by the current traversing the armature through a pair of brushes diametrically opposite does not coincide with the diameter connecting said brushes and the stator windings will be angularly displaced as compared with the stator windings of the accompanying figures.

I claim:

1. An electric system comprising a direct current source, one load circuit and a rotating dynamoelectric machine having an armature associated with a commutator, a pair of non-consecutive primary brushes and a pair of secondary brushes per cycle and a plurality of stator windings, a control circuit including one of said stator windings traversed by a control current and having its magnetic axis substantially coincident with the axis of the flux created by the current traversing the armature through its secondary brushes, means for connecting said primary brushes to said source of current, means for connecting said load circuit to said secondary brushes, whereby said dynamo electric machine amplifies said control current and supplies said load circuit with the amplified current, an auxiliary dynamo for energizing another stator winding with a current varying with the load of said dynamoelectric machine, said other stator winding having its magnetic axis substantially coincident with the axis of the flux created by the current traversing the armature through its primary brushes, whereby said dynamoelectric machine is rotated at a predetermined speed by the electric power derived from said source of current.

2. An electric system comprising a direct current source, two load circuits and a rotating dynamoelectric machine having an armature associated with a commutator, a pair of non-consecutive primary brushes and a pair of secondary brushes per cycle and a plurality of stator windings, a control circuit including one of said stator windings traversed by a control current, and having its magnetic axis substantially coincident with the axis of the flux created by the current traversing the armature through its secondary brushes, means for connecting said primary brushes to said source of current, means for connecting one of said load circuits between one of said secondary and one of said primary brushes, means for connecting the other of said load circuits between the other secondary brush and the other primary brush, whereby said dynamo electric machine amplifies said control current and supplies said load circuit with the amplified current, dynamo means for energizing another stator winding with a current varying with the load of said dynamoelectric machine, said other stator winding having its magnetic axis substantially coincident with the axis of the flux created by the current traversing the armature through its primary brushes, whereby said dynamoelectric machine is rotated at a predetermined speed by the electric power derived from said source of current.

3. An electric system comprising a direct current source, at least one load circuit, a speed regulator dynamo provided with a field winding for self excitation and a rotating dynamoelectric machine having an armature associated with a commutator, a pair of non-consecutive primary brushes and a pair of secondary brushes per cycle and a plurality of stator windings, a control circuit including one of said stator windings traversed by a control current and having its magnetic axis substantially coincident with the axis of the flux created by the current traversing the armature through its secondary brushes, means for connecting said primary brushes to said source of current, means for connecting at least one of said secondary brushes to said load circuit, whereby said dynamoelectric machine amplifies said control current and supplies said load circuit with the amplified current, means for coupling said regulator dynamo to said dynamoelectric machine, another of said stator windings in circuit with said regulator dynamo, said other winding having its magnetic axis substantially coincident with the axis of the flux created by the current traversing the armature through its primary brushes whereby said dynamoelectric machine is rotated at a predetermined speed by the electric power derived from said source of current.

4. The system as in claim 3 and in addition means for connecting a third of said stator windings in series with the secondary brushes of said dynamoelectric machine, said third mentioned stator winding having its magnetic axis coincident with the axis of the flux created by the current traversing the armature through its secondary brushes and compensating said last mentioned flux.

5. The electric system as in claim 3 and in addition means for connecting a third of said stator windings in parallel with the primary brushes of said dynamoelectric machine, said third stator winding having its magnetic axis substantially coincident with the magnetic axis of the flux created by the current traversing the armature through its secondary brushes, said third mentioned stator winding creating a flux inducing between the primary brushes a voltage substantially equal to the voltage of said direct current source.

6. The system as in claim 3 and in addition means for connecting a third of said stator windings in series with the secondary brushes of said dynamoelectric machine, said third mentioned stator winding having its magnetic axis coincident with the axis of the flux created by the current traversing the armature through its secondary brushes and compensating said last mentioned flux, said third mentioned stator winding including coils each of which is interlinked with the stator polar segments on either side of the magnetic axis of said third mentioned winding.

JOSEPH MAXIMUS PESTARINI.

REFERENCES CITED

The following references are of record in the file of this patent:

UNITED STATES PATENTS

| Number | Name | Date |
|---|---|---|
| 1,962,030 | Pestarini | June 5, 1934 |
| 2,445,788 | Litman | July 27, 1948 |
| 2,454,581 | Thomas | Nov. 23, 1948 |

FOREIGN PATENTS

| Number | Country | Date |
|---|---|---|
| 773,697 | France | Sept. 3, 1934 |

OTHER REFERENCES

Publication, "Design Characteristics of Amplidyne Generators" by Alec Fisher, General Electric Review, March 1940, pages 107–113, inclusive.